(No Model.)
J. L. HAYWARD.
NUT LOCK.
No. 491,173.
Patented Feb. 7, 1893.
FIG. 1.
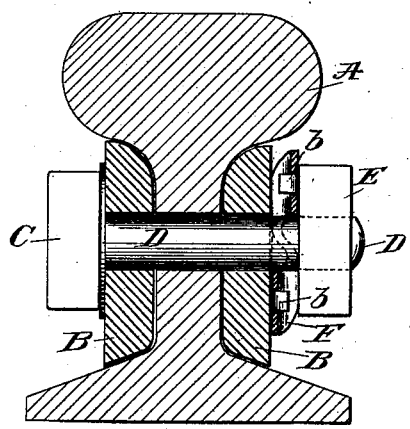
FIG. 2.   FIG. 3.
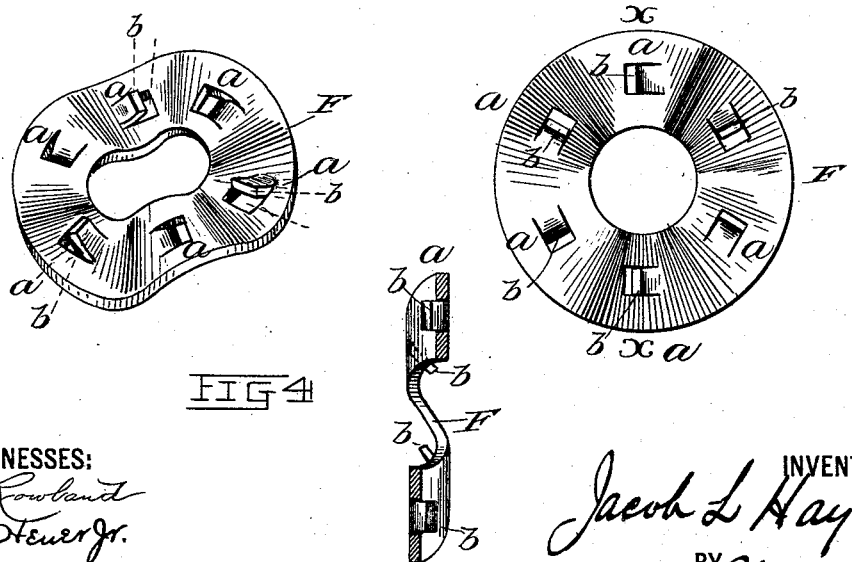
FIG 4.
WITNESSES:
INVENTOR
Jacob L. Hayward
BY
Phillips Abbott
ATTORNEY

UNITED STATES PATENT OFFICE.

JACOB L. HAYWARD, OF WADEVILLE, NORTH CAROLINA, ASSIGNOR OF ONE-HALF TO W. B. CRITTENDEN, OF BUCYRUS, OHIO.

NUT-LOCK.

SPECIFICATION forming part of Letters Patent No. 491,173, dated February 7, 1893.

Application filed October 22, 1892. Serial No. 449,592. (No model.)

*To all whom it may concern:*

Be it known that I, JACOB L. HAYWARD, a citizen of the United States, and a resident of Wadeville, in the county of Montgomery and State of North Carolina, have invented certain new and useful Improvements in Nut-Locks, of which the following is a specification.

My invention relates to improvements in nut locks and it consists in constructing the nut lock from a flat, and preferably disk-like, piece of suitable metal which has been swaged or otherwise given an undulatory or wavy circumferential contour in its horizontal plane, in other words flatwise of the disk; and from the disk thus shaped I cut teeth preferably by punching or cutting them out of the disk itself, and in such manner that some of the teeth project on one side of the disk and some of them on the other side, and the square edges of these teeth are preferably given a chisel point or edge as hereinafter described. The teeth may, however, be other shape than square at their point. The length of the teeth relative to the depth of the waves or undulations in the disk is such that the disk will have to be flattened considerably by the pressure of the nut before the teeth will engage either of the surfaces against which it locks.

In the drawings hereof, Figure 1 shows my invention applied to an ordinary railroad rail with fish plates, &c. The plates and the rail and the nut lock are shown in section. Fig. 2, illustrates a perspective of my nut lock. Fig. 3, illustrates a plan view of the nut lock. Fig. 4, illustrates a vertical section on the line *x x* of Fig. 3.

Referring now to Fig. 1, A is the rail, B B, are the fish plates; C is the bolt head; D is the bolt; E is the nut and F is the nut lock.

Referring now to Figs. 2, 3 and 4 the nut lock F is shown as a circular disk of steel; any other suitable metal may of course be employed but ordinarily oil tempered spring steel is preferred by me. This disk of steel is given an undulated or corrugated form in its horizontal plane, the corrugations are seen at *a, a, a, a, a, a* and at preferably equal distances circumferentially of the disk I cut out the teeth *b, b, b, b, b, b* one half of them, or approximately one half, being forced through or beyond the plane of the plate at one side and the other half of them being likewise made to protrude from the other side of the disk, and their square ends are as shown preferably given a rather obtuse chisel edge; and, as will be seen best in Fig. 4, these teeth do not project beyond the sides of the disk so far as to reach the plane of the tops of the corrugations or convolutions in the disk. Consequently, when the nut is screwed down upon the bolt it first bears against the apices of the convolutions and the fish plate or other surface, whatever it may be, against which the nut lock rests, presses against the apices of the convolutions which project in the opposite direction. Consequently it is necessary for the nut to flatten the disk somewhat before the teeth will engage either with the nut itself or with the fish plate, and herein I gain a very decided advantage over other forms of nut lock known to me. That is to say, the pressure which the nut exerts in flattening the disk will be nearly but not quite all the pressure that it is desirable to have it exert to accomplish its intended work in holding the parts together, and also, when it has been turned up to its fullest extent so that the teeth engage as will be in a moment explained, the disk acts permanently as a spring washer. Thus I secure in my form of nut lock not only the advantages of a nut lock, but also those of a spring washer; so that, it will be unnecessary to use the elastic washers such as lead, copper, cowhide, rubber &c. which are in some structures used under the head of the bolt to reduce liability of fracture consequent upon sudden shock, changes in temperature &c. As the nut gradually flattens the disk, as before stated, the teeth *b, b,* draw nearer and nearer to the surfaces of the nut on one side and the fish plate or other thing on the other side, and finally, during the last few turns that are given to the nut, the disk has been so much flattened that the teeth have projection beyond its plane on both sides, so that they engage with the nut on one side and the fish plate or other thing on the other side in a well known manner. And here appears another important advantage in my form of nut lock i. e. the teeth are not subjected to the wearing or rounding off action of the nut and fish plate upon their cutting edges during a large part of the operation of screwing up the nut, as is the case with many forms of nut lock, but on the contrary, this rubbing action takes place to a limited extent only, and just at the conclusion of the act of turning up the nut; thus the edges of the teeth are practically uninjured and immediately take hold upon the metal to prevent the unturning of the nut.

It will be obvious to those who are familiar with this art, that various modifications of my invention may be employed; that is to say, the teeth may be of such contour or outline as desired; also, the disk may be of any shape; also, there may be more or less teeth than shown; also, they may be cut out from the inner edge of the disk next to the bolt hole or, the disk may be made not larger than the nut and they may be cut out from the outer edge, or those which are intended to bear against the fishplate may be cut out from one edge, and those which are to bear against the nut may be cut out from the other edge.

I claim

1. A nut lock consisting of a corrugated piece of metal having teeth punched or made from the body of the metal itself, some of the teeth projecting at one side of the metal and some at the other side, substantially as set forth.

2. A nut lock consisting of a corrugated piece of metal having teeth thereon which project in opposite directions, the points of which teeth fall within the planes of the corrugations at each side of the metal substantially as set forth.

Signed at Bald Mountain, in the county of Sheridan and State of Wyoming, this 12th day of September, A. D. 1892.

JACOB L. HAYWARD.

Witnesses:
H. H. HAWKINS,
J. B. MENARDI.